(12) United States Patent
White

(10) Patent No.: US 12,546,438 B2
(45) Date of Patent: Feb. 10, 2026

(54) ANCHOR ASSEMBLY

(71) Applicant: GRIPPLE LIMITED, Sheffield (GB)

(72) Inventor: Samuel White, Sheffield (GB)

(73) Assignee: GRIPPLE LIMITED (GB)

( * ) Notice: Subject to any disclaimer, the term of this patent is extended or adjusted under 35 U.S.C. 154(b) by 5 days.

(21) Appl. No.: 18/571,785

(22) PCT Filed: Jul. 4, 2022

(86) PCT No.: PCT/IB2022/056167
§ 371 (c)(1),
(2) Date: Dec. 19, 2023

(87) PCT Pub. No.: WO2023/281374
PCT Pub. Date: Jan. 12, 2023

(65) Prior Publication Data
US 2024/0288115 A1    Aug. 29, 2024

(30) Foreign Application Priority Data

Jul. 7, 2021 (GB) .................................. 2109800
Jun. 27, 2022 (GB) .................................. 2209364

(51) Int. Cl.
*F16M 13/02* (2006.01)
*E04B 1/41* (2006.01)

(52) U.S. Cl.
CPC ........... *F16M 13/027* (2013.01); *E04B 1/415* (2013.01)

(58) Field of Classification Search
CPC ...... E04B 1/4114; E04B 1/415; F16M 13/027
See application file for complete search history.

(56) References Cited

U.S. PATENT DOCUMENTS

| | | | |
|---|---|---|---|
| 3,758,922 A | 9/1973 | Field | |
| 4,668,144 A | 5/1987 | Giannuzzi | |
| 4,787,592 A | 11/1988 | Aoshika | |
| 10,954,666 B2 * | 3/2021 | Somerfield | ........... E04B 1/4114 |
| 11,215,320 B2 * | 1/2022 | Somerfield | ............... E04B 9/18 |
| 11,674,637 B2 * | 6/2023 | Somerfield | ............... F16B 2/04 |
| | | | 248/343 |
| 11,754,223 B2 * | 9/2023 | Somerfield | ............... F16B 2/04 |
| | | | 248/343 |
| 2003/0115723 A1 | 6/2003 | Shuey | |
| 2018/0142464 A1 * | 5/2018 | Somerfield | ......... F16B 13/0833 |

FOREIGN PATENT DOCUMENTS

| | | |
|---|---|---|
| EP | 1555479 A1 | 7/2005 |
| GB | 2378999 A | 2/2003 |
| GB | 2483761 A | 3/2012 |
| GB | 2492203 A | 12/2012 |

(Continued)

*Primary Examiner* — Bradley Duckworth
(74) *Attorney, Agent, or Firm* — Clark Hill PLC; James R. Foley

(57) ABSTRACT

There is provided an anchor assembly (10) and an insertion device (14) for an anchor (12). The anchor assembly (10) comprises the anchor (14) mountable on a support (22), the anchor (14) comprising a body (16), the body (16) defining a cavity (18) and an opening (42). The assembly (10) further includes the insertion device (14) insertable into the cavity (18) via the opening (42). The insertion device (14) comprises a securing member (46) movable between securing and insertion positions.

19 Claims, 5 Drawing Sheets

(56) References Cited

FOREIGN PATENT DOCUMENTS

| | | |
|---|---|---|
| GB | 2565639 A | 2/2019 |
| JP | 3103508 U | 8/2004 |
| JP | 2005061490 A | 3/2005 |
| JP | 2019090519 A | 6/2019 |
| KR | 102128258 B1 | 6/2020 |
| WO | 2018011533 A1 | 1/2018 |
| WO | 2019/008307 A1 | 1/2019 |

\* cited by examiner

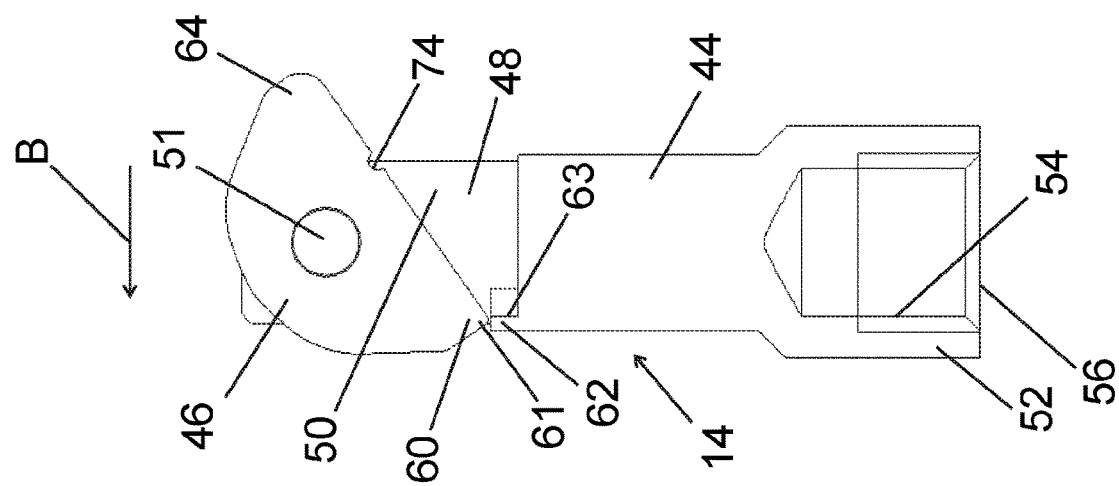
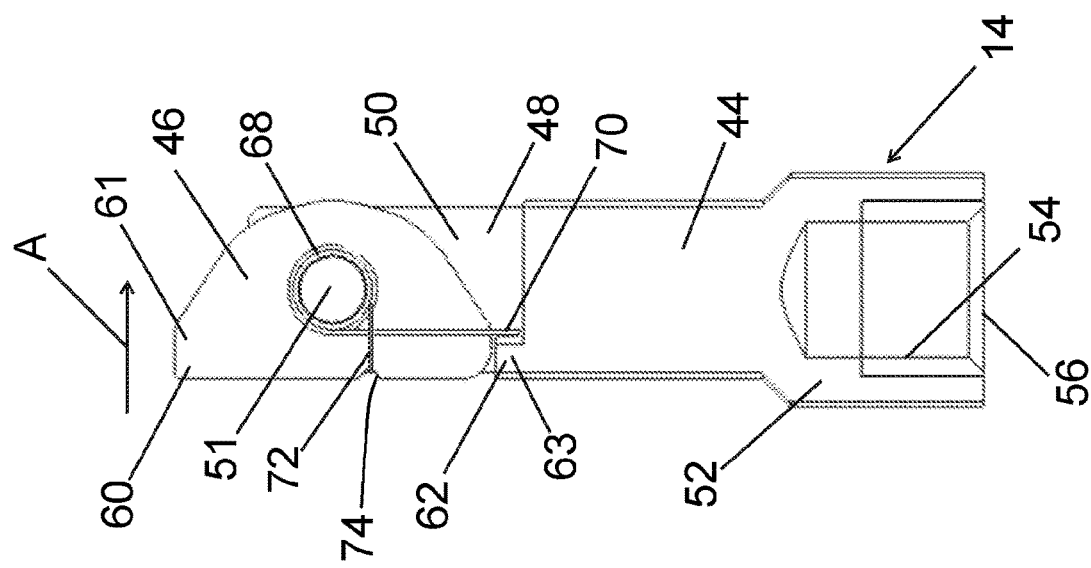
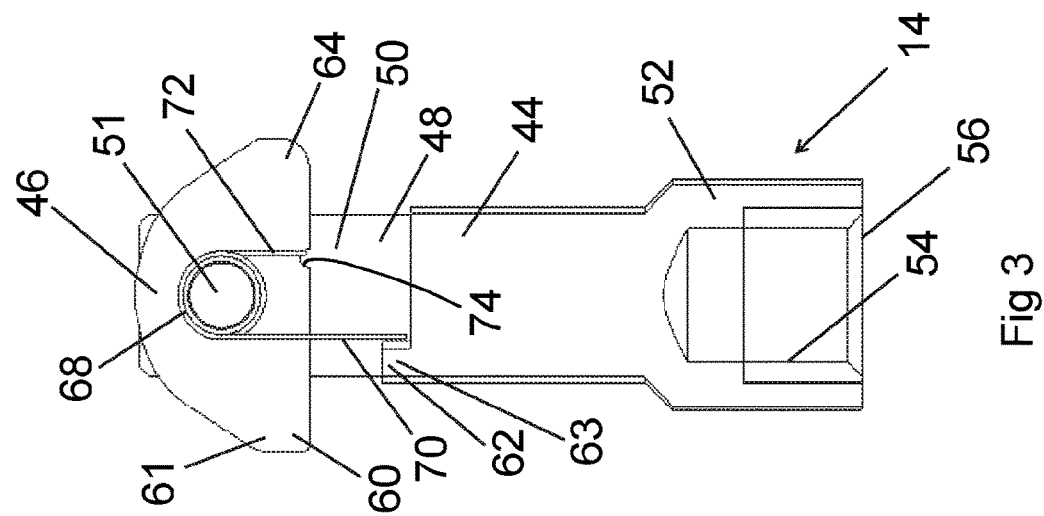

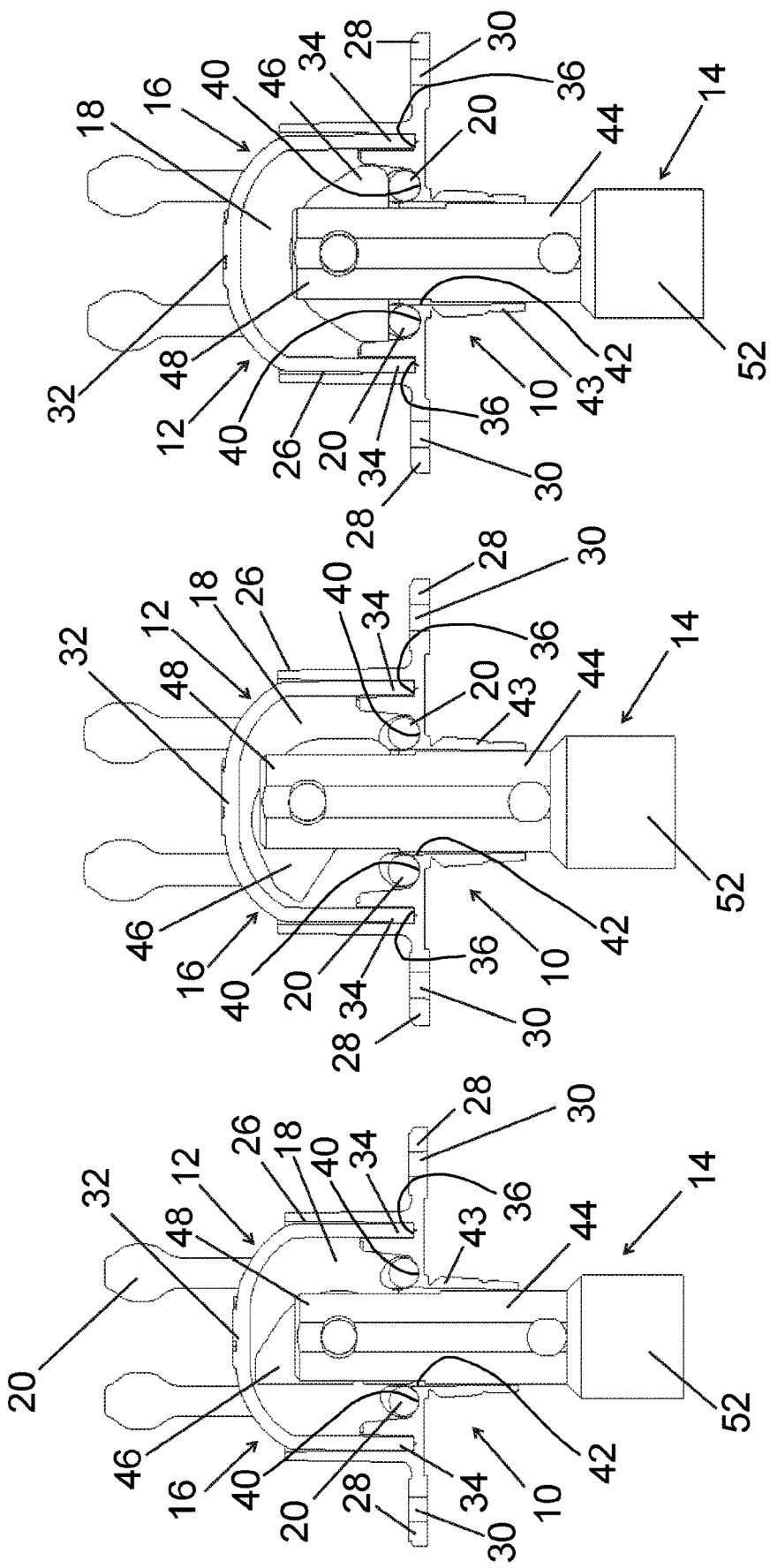

ANCHOR ASSEMBLY

This application is a National Phase Filing of PCT/IB2022/056167, having an International filing date of Jul. 4, 2022, which claims priority of GB 2109800.9, filed Jul. 7, 2021 and GB 2209364.5, filed Jun. 27, 2022. The disclosure of the foregoing are hereby incorporated by reference.

This invention relates to anchor assemblies. This invention also relates to insertion devices for use in anchor assemblies.

It is known to use anchors in ceilings to suspend items therefrom. The weight that can be supported by such anchors can be limited. Some anchors are provided with insertion devices having movable securing toggles, sometimes it can be difficult to cause the toggle to move to a securing position.

According to one aspect of the invention, there is provided an insertion device comprising: a main part; a securing member pivotally mounted on the main part, the securing member being pivotally movable between securing and insertion positions; and an urging member arranged between the main part and the securing member; wherein the urging member is arranged to urge the securing member to the securing position.

The insertion device may be for use with an anchor. For example, the anchor may be a ceiling anchor mounted in or on an upper support, such as a ceiling. The insertion device may be insertable into a cavity in a body of the anchor.

According to another aspect of this invention, there is provided an anchor assembly comprising: an anchor mountable on a support, the anchor comprising a body, the body defining a cavity and an opening; and the assembly further including an insertion device insertable into the cavity via the opening; the insertion device comprising a securing member movable between securing and insertion positions; wherein when the movable securing member is in the securing position in the cavity, the securing member extends across the opening to secure the insertion device to the anchor.

The insertion device secures a suspension article, such as a threaded rod to the anchor. The anchor may be mounted in or on an upper support, such as a ceiling. Thus, the anchor assembly secures the suspension article to the ceiling.

The securing member may comprise a toggle. The securing member may be pivotally movable in a securing direction relative to the main part. The pivotal movement of the securing member in said securing direction may move the securing member to the securing position.

The urging member may urge the securing member in said securing direction.

The securing position of the securing member may be a transverse position of the securing member. In the transverse position, the securing member may extend across the main part.

The securing member and the main part may have respective longitudinal axes whereby, in the securing position of the securing member, the longitudinal axis of the securing member may extend across the longitudinal axis of the main part.

The insertion position of the securing member may be an aligned position, in which the securing member is aligned with the main part. In the insertion position of the securing member, the longitudinal axis of the securing member may extend substantially parallel with the longitudinal axis of the main part.

The insertion device may comprise cooperating stop formations to restrict or prevent rotation of the securing member in the securing direction to the insertion position.

The securing member may comprise a first of the cooperating stop formations. The main part may comprise a second of the cooperating stop formations. The first of the cooperating stop formations may comprise a first tip of the securing member. The second of the cooperating stop formations may comprise a wall of the main part.

The securing member may have a second tip opposite the first tip. The distance between the first tip and the pivot element may be large enough to allow the first tip to engage the second cooperating stop formation.

The wall may be engageable by the tip of the securing member when the securing member is moved in said insertion direction. The engagement of the tip with the wall may prevent pivoting movement, or further pivoting movement, in said insertion direction.

The main part may have a finger. The main part may have plurality of fingers defining the space. The main part may have two opposed fingers defining the space therebetween.

The securing member may be pivotally attached to the, or each finger. The, or each, finger may have a free end. The, or each, finger may have opposite edges.

The securing member may be aligned with the, or each, finger when the securing member is in the non-securing position. The securing member may extend beyond the, or each, free end when the securing member is in the non-securing position.

The securing member may extend transverse to the, or each, finger when the securing member is in the securing position. The securing member may extend across the, or each, finger when the securing member is in the securing position. The securing member may extend beyond the edges of the, or each, finger when the securing member is in the securing position.

The main part may define a space in which the securing member is received. The space may be a slot. The space may have an open end through which the securing member may extend when the securing member is in the non-securing position.

The space may have opposite open edges through which the securing member may extend when the securing member is in the securing position. The wall may extend across one of the open edges.

The space may be defined between the fingers. The open end of the space may be defined between the free ends of the fingers. The opposite open edges of the space may be defined between the edges of the fingers.

The securing member may be pivotally attached to one of the fingers. A pivot element may extend from said one of the fingers to the securing member. The securing member may be pivotally attached to both of the fingers.

The pivot element may extend between the fingers. The pivot element may extend through the securing member. Thus, the pivot element pivotally attaches the securing member to the main part.

The securing member may be rotatable around the pivot element. The pivot element may extend through the securing member centrally of the securing member.

The urging member may engage the main part. The urging member may engage the securing member. The urging member may extend around the pivot element.

The urging member may extend between the second cooperating formation and the securing member. The urging member may engage the second cooperating formation. The urging member may engage the securing member.

The urging member may have opposite end regions. One of the end regions may engage the second cooperating formation. The other of the end regions may engage the securing member.

The securing member may define an indentation. The indentation may be offset from the pivot element. The other of said opposite end regions of the urging member may be received in said indentation.

The urging member may be a spring, such as a coil spring. Where the urging member is a coil spring, the coils of the spring may extend around the pivot element.

The main part may include a fastening portion for fastening an article, such as a threaded rod, to the insertion device. The fastening portion may define a bore to receive the article. The bore may be threaded.

The anchor may comprise a reinforcing member extending through the cavity and outwardly from the body. When the movable securing member is in the securing position in the cavity, the securing member may engage the reinforcing member to secure the insertion device to the anchor.

The reinforcing member may be elongate. The anchor may comprise a plurality of the reinforcing members extending through the cavity and outwardly from the body. The reinforcing members may be arranged around the opening.

The anchor may comprise two of the reinforcing members arranged opposite each other. The opening may be defined between the reinforcing members.

A tubular guide member may extend from the holding member around the opening. The insertion device may be inserted through the guide member during insertion of the insertion device into the cavity. The insertion device may be inserted through the opening via the guide member. In use, the guide member may extend through the support so that it is visible by the user.

The reinforcing members may be provided to reinforce a curable material disposed over the anchor. The reinforcing members may project into the curable material. The curable material may be concrete.

The body may comprise a cover member which extends over the cavity. The body may comprise a holding member for holding the reinforcing members. The cover member may be mountable on the holding member. The cavity may be defined between the cover member and the holding member.

The cover member and the holding member may comprise attaching formations to attach the cover member to the holding member. The attaching formations may comprise a socket and an attaching formation receivable in the socket.

The holding member may comprise the socket. The cover member may comprise the attaching formation. The cover member may include a cover wall. The attaching formation may extend from the cover wall.

The holding member may engage the support. The holding member may comprise a support engaging portion to engage the support.

The holding member may be a base portion. The holding member may comprise one or more receiving formations to receive the, or each, reinforcing member. Where the anchor comprises a plurality of the reinforcing members, the body may define a plurality of receiving formations to receive the reinforcing members.

The, or each, receiving formation may be defined in the holding member. The body may comprise fixing formations to allow the anchor to be fixed to the support. The fixing formations may be apertures defined by the body. The apertures may be defined by the holding member.

The body may comprise lugs defining the aforesaid apertures. The body may define two oppositely extending lugs. The lugs may be provided on the holding member.

An embodiment of the invention will now be described by way of example only, with reference to the accompanying drawings, in which:

FIG. 3 is a sectional side view of the insertion device, in which a securing member is shown in a securing position;

FIG. 4 is a sectional side view of the insertion device, in which the securing member is shown in an insertion position;

FIG. 5 is a sectional side view of the insertion device, in which a first cooperating stop formation of the securing member engages a second cooperating stop formation of a main part;

FIGS. 7, 8 and 9 show the sequence in which the insertion device is inserted into the anchor, and secured thereto.

Figure 1:
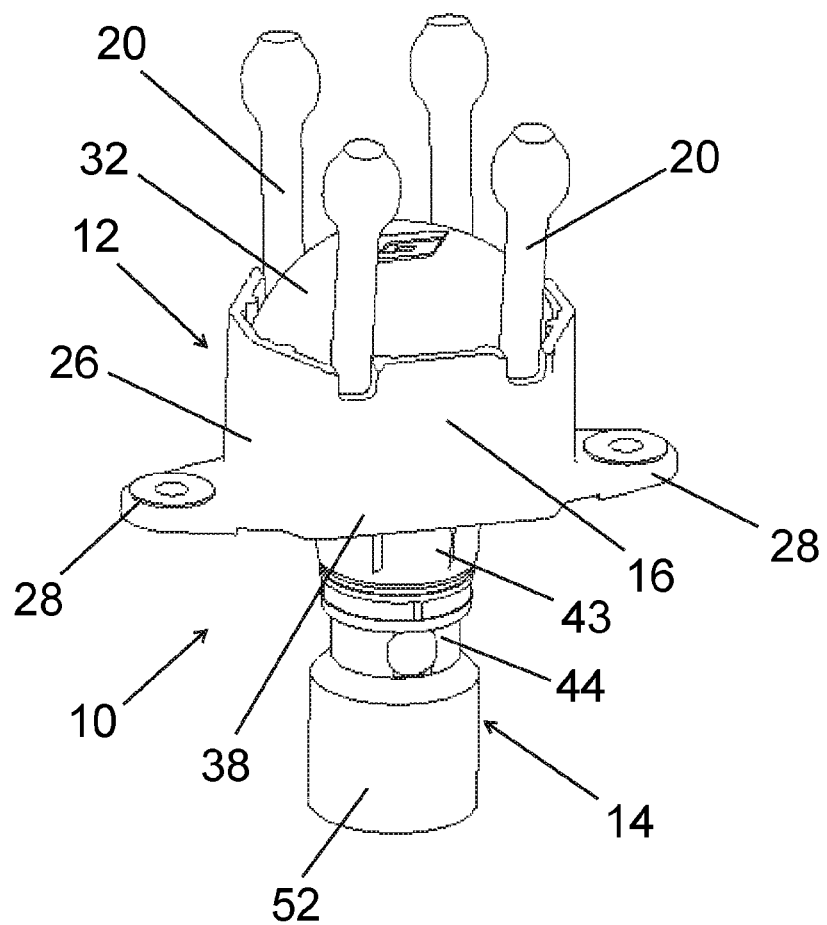
FIG. 1 is a perspective view of an anchor assembly.

The drawings show an anchor assembly 10 for use in a region of a building over which a curable material, such as concrete, is poured. An example of such a region is a floor formed above a ceiling. It is often desirable to suspend articles, such as lighting, and utilities, such as piping and cable trays, from the ceiling.

The anchor assembly 10 comprises an anchor 12 and an insertion device 14. The anchor 12 comprises a body 16 defining a cavity 18 (see FIGS. 7, 8 and 9). The anchor 12 further includes two elongate reinforcing members 20, in the form of cables, which extend through the body 16 and project outwardly therefrom on opposite sides of the body 16. When the concrete is poured over the anchor 12, the reinforcing members 20 are covered by the concrete. As a result, the reinforcing members 20 provide reinforcement to the concrete, and help secure the anchor 12 to the concrete.

The anchor 12 is mounted on a support 22, which may be the ceiling mentioned above. Concrete is poured over the anchor 12 and across the ceiling to form a floor for the room above the ceiling. Therefore, the anchor 12 allows a user to suspend articles from the insertion device 14 inserted into the anchor 12 from the room below the ceiling. Prior to mounting the anchor 12 on the support 22 (shown in broken lines in FIG. 6), a hole 24 is drilled through the support 22, and anchor arranged over the hole 24, so that the guide member 43 projects through the hole 24.

The body 16 comprises a holding member 26 fixed to the support 22. Two fixing formations in the form of lugs 28 are provided on the holding member 26. Each of the lugs 28 defines an aperture 30 through which a fixing member, such as a nail (not shown), can be driven into the support 22, thereby fixing the holding member 26 to the support 22.

Referring to FIGS. 7 to 9, the body 16 further includes a dome shaped cover member 32 mounted on the holding member 26. The cover member 32 has a lower edge 34.

The cavity 18 is defined between the cover member 32 and the holding member 26. The lower edge 34 of the cover member 32 is received in a recess 36 defined around the rim 38 of the holding member 26 to attach the cover member 32 to the holding member 26.

The holding member 26 defines an opening 42 through which the insertion device 14 can be inserted into the cavity 18. A tubular guide member 43 extends from the holding member 26 around the opening 42. The insertion device 14 is inserted through the opening 42 via the guide member 43. In use, the guide member 43 extends through the support 22 so that it is visible by the user.

The holding member 26 has two receiving formations 40 in which the reinforcing members 20 are held. The opening 42 is defined between the receiving formations 40. Opposite end regions of each reinforcing member 20 extend out of the body 16 through gaps defined between the cover member 32 and the holding member 26.

The insertion device 14 comprises a main part 44 and a securing member 46 pivotally mounted on the main part 44. The main part 44 has a pair of opposed fingers 48 defining a space 50 therebetween. The securing member 46 is arranged in the space 50 between the fingers 48.

A pivot element 51 is attached to both fingers 48, and extends through the securing member 46. The securing member 46 is rotatable around the pivot element 51. It will be appreciated that the securing member 46 may alternatively be fixedly attached to the pivot element 51, and the pivot element 51 may be pivotable about the fingers 48.

Figure 2:
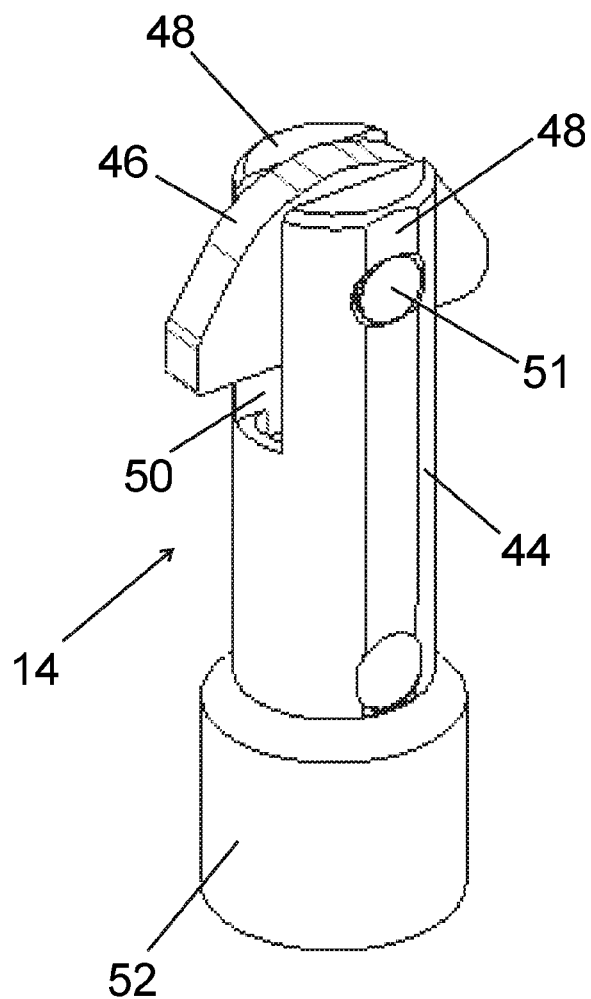
FIG. 2 is a perspective view of an insertion device for use in the anchor assembly.
Figure 6:
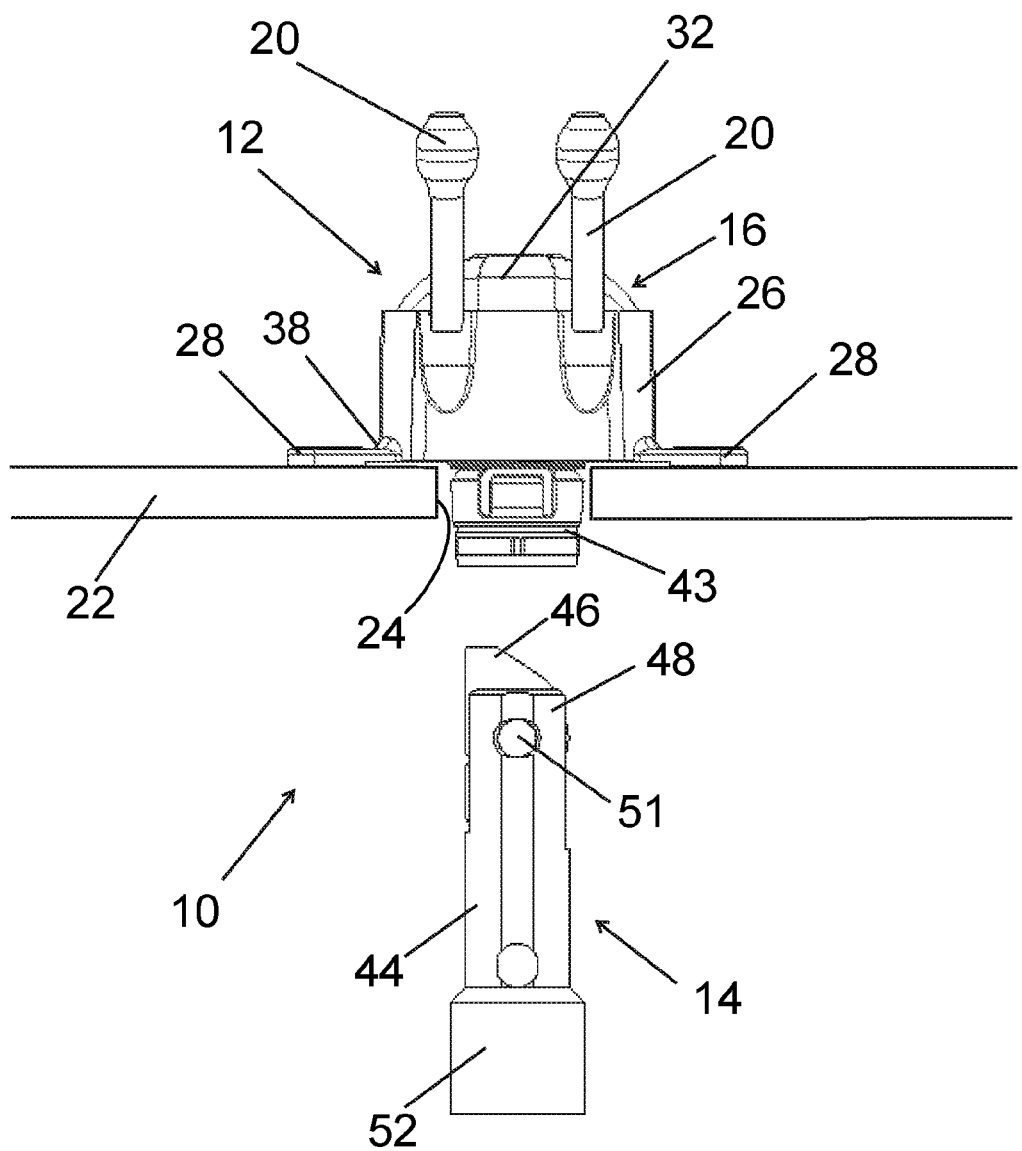
FIG. 6 is a side view of an anchor assembly comprising an anchor and the insertion assembly, the anchor assembly being shown in a position for insertion into the anchor.

The securing member 46 is pivotally movable about the pivot element 51 between securing and insertion positions. The securing position of the securing member 46 is shown in FIGS. 2, 3 and 9. The insertion position of the securing member 46 is shown in FIGS. 4, 6 and 7.

Referring to FIGS. 3, 4 and 5, the insertion device 14 comprises first and second cooperating stop formations 60, 62 to restrict rotation of the securing member 46 in the securing direction to the insertion position. The securing member 46 comprises the first cooperating stop formation 60. The main part 44 comprises the second cooperating stop formation 62.

The first cooperating stop formation 60 comprises a first tip 61 of the securing member 46. The second cooperating stop formation 62 comprises a wall 63 of the main part 44, the wall 63 extending between the fingers 48, across the space 50.

The distance between the first tip 61 and the pivot element 51 is large enough to allow the first tip 61 to engage the wall 63. The securing member 46 can be moved from the securing position shown in FIG. 3 towards the insertion position in the securing direction shown by the arrow B in FIG. 5. However, when such movement of the securing member 46 is attempted, the first tip 61 engages the wall 63.

The engagement of the first tip 61 with the wall 63 prevents further pivoting movement of the securing member 46 in the securing direction. This provides the advantage in the embodiment described herein that the securing member 46 cannot be rotated in the wrong direction when attempting to pivot it to the insertion position.

The securing member 46 has a second tip 64 opposite the first tip 61. The distance between the second tip 64 and the pivot element 51 is less than the distance between the first tip 61 and the pivot element 51. This allows the securing member 46 to be pivoted in the insertion direction, shown by the arrow A in FIG. 4, to the insertion position shown in FIGS. 4, 6 and 7. In the insertion position, the second tip is disposed over the wall 63. Thus, the securing member 46 is aligned with the main part 44 when the securing member 46 is in the insertion position.

The insertion device 14 includes an urging member in the form of a coil spring 68 extending around pivot element 51. The coil spring 68 urges the securing member 46 to the securing position.

The coil spring 68 has a first end region 70 that engages the wall 63, and a second end region 72 received in an indentation 74 defined in the securing member 46.

The provision of the coil spring 68 provides the advantage in the embodiment described herein that the securing member 46 automatically locks itself in the securing position when it has been inserted into the anchor 12, and cannot be removed. Thus, the danger of the insertion device 14 being inadvertently dislodged from the anchor 12 is minimised.

The main part 44 includes a fastening portion 52 for fastening a suspension article, such as a threaded rod, to the insertion device 14. The fastening portion 52 is provided at the opposite end of the main part 44 to the fingers 48. The fastening portion 52 defines a bore 54 and has an open lower end 56 to allow the suspension article to be received in the bore 54. The bore 54 may be threaded so that, where the suspension article is a threaded rod, the suspension article can be screwed into the bore 54.

In order to insert the insertion device 14 into the anchor 12, the securing member 46 is pivotally rotated in an insertion direction from the securing position shown in FIG. 3 to the insertion position shown in FIG. 4, as indicated by the arrow A. Thereafter, as shown in FIG. 6, the insertion device 14 is inserted into the guide member 43 of the anchor 12 projecting through the support 22. The insertion device 14 is then inserted into the cavity 18 through the opening 42. While the insertion device 14 is being inserted through the guide member 43, the guide member 43 engages the securing member 46, thereby retaining the securing member 46 in the insertion position.

Referring to FIGS. 7, 8 and 9, there is shown the sequence after the insertion device 14 has been inserted into the cavity 18 defined in the anchor 12. FIG. 7 shows the insertion device 14 just as the securing member 46 is received in the cavity 18.

FIG. 8 shows the securing member 46 of the insertion device 14 being urged by the coil spring 68 from the insertion position to the securing position. FIG. 9 shows the insertion device 14 in which the securing member 46 has moved fully to the securing position, and the insertion device 14 having been lowered so that the first and second tips of the securing member 46 engage the reinforcing members 20.

In the position of the insertion device 14 shown in FIG. 9, a threaded rod can be screwed into the bore 54, thereby fastening the threaded rod to the insertion device 14.

There is thus described an insertion device 14, and an anchor assembly 10 comprising an anchor 12 and an insertion device 14. In the insertion device 14, a securing member 46 is pivotally attached to a main part 44 of thereof. A coil spring 68 urges the securing member 46 to the securing position. This provides the advantage in the embodiment described herein that the securing member 46 pivots automatically to the securing position, and does not have to be moved to the securing position by being pushed against the cover member 32 of the anchor 12.

The insertion devices 14 may be manufactured in a plurality of sizes to accommodate threaded rods of different sizes. This may be done by making the fastening portion in different sizes.

Various modifications can be made without departing from the scope of the invention.

The invention claimed is:

1. An anchor assembly comprising:
an anchor mountable on a support, the anchor comprising a body, the body defining a cavity and an opening;
the assembly further including an insertion device insertable into the cavity via the opening;
the insertion device comprising a securing member movable between securing and insertion positions;

wherein when the securing member is in the securing position in the cavity, the securing member extends across the opening to secure the insertion device to the anchor, wherein the insertion device comprises:
a main part;
the securing member pivotally mounted on the main part,
the securing member being pivotally movable between the securing and insertion positions; and
a spring arranged between the main part and the securing member;
wherein the spring is arranged to urge the securing member to the securing position when the securing member is in the cavity of the anchor,
wherein the securing member is pivotally movable in a securing direction relative to the main part,
wherein the pivotal movement of the securing member in said securing direction moves the securing member to the securing position,
wherein the insertion device comprises cooperating stop formations to restrict or prevent rotation of the securing member in the securing direction to the insertion position,
wherein the securing member comprises a first of the cooperating stop formations,
wherein the main part comprises a second of the cooperating stop formations,
wherein the main part defines a space in which the securing member is received,
wherein the main part has a plurality of fingers defining the space,
wherein the first cooperating stop formation comprises a first tip of the securing member,
wherein the second cooperating stop formation comprises a wall of the main part, and
wherein the wall extends between the fingers and across the space.

2. The anchor assembly of claim 1, wherein the spring extends between the second cooperating stop formation and the securing member.

3. The anchor assembly of claim 1, wherein the securing member is pivotally attached to the plurality of fingers.

4. The anchor assembly of claim 3, wherein the securing member is aligned with the plurality of fingers when the securing member is in the insertion position.

5. The anchor assembly of claim 3, wherein the securing member extends transverse to the plurality of fingers when the securing member is in the securing position.

6. The anchor assembly of claim 1, wherein the spring engages the main part, and wherein the spring engages the securing member.

7. The anchor assembly of claim 1, wherein the main part includes a fastening portion to fasten an article to the insertion device.

8. The anchor assembly of claim 1, wherein the anchor comprises an elongate reinforcing member extending through the cavity and outwardly from the body.

9. The anchor assembly of claim 8, wherein when the securing member is in the securing position in the cavity, the securing member engages the elongate reinforcing member to secure the insertion device to the anchor.

10. The anchor assembly of claim 8, wherein the anchor comprises a plurality of the elongate reinforcing members extending through the cavity and outwardly from the body.

11. The anchor assembly of claim 10, wherein the anchor comprises two of the elongate reinforcing members arranged opposite each other, and wherein the opening is defined between the elongate reinforcing members.

12. The anchor assembly of claim 10, wherein the body comprises a holding member to hold the elongate reinforcing members, wherein a tubular guide member extends from the holding member around the opening, and wherein the insertion device can be inserted through the tubular guide member during insertion of the insertion device into the cavity.

13. The anchor assembly of claim 12, wherein the holding member is a base portion, wherein the holding member comprises one or more receiving formations to receive the, or each, elongate reinforcing member.

14. The anchor assembly of claim 10, wherein the body comprises a cover member which extends over the cavity, wherein the body comprises a holding member to hold the elongate reinforcing members, and wherein the cover member is mountable on the holding member.

15. The anchor assembly of claim 14, wherein the cover member and the holding member comprise attaching formations to attach the cover member to the holding member.

16. The anchor assembly of claim 1, wherein the body comprises fixing formations to allow the anchor to be fixed to the support.

17. The anchor assembly of claim 1, wherein the spring is at a location proximal to a same end of the insertion device as the securing member, wherein the spring is in the cavity when the insertion device is inserted into the cavity.

18. The anchor assembly of claim 1, wherein the securing member is rotatable around a pivot element, wherein the securing member has a second tip opposite the first tip, wherein the distance between the first tip and the pivot element is large enough to allow the first tip to engage the second cooperating stop formation.

19. An anchor assembly comprising:
an anchor mountable on a support, the anchor comprising a body, the body defining a cavity and an opening;
the assembly further including an insertion device insertable into the cavity via the opening;
the insertion device comprising a securing member movable between securing and insertion positions;
wherein when the securing member is in the securing position in the cavity, the securing member extends across the opening to secure the insertion device to the anchor,
wherein the insertion device comprises:
a main part;
the securing member pivotally mounted on the main part,
the securing member being pivotally movable between the securing and insertion positions; and
a spring arranged between the main part and the securing member;
wherein the spring is arranged to urge the securing member to the securing position when the securing member is in the cavity of the anchor,
wherein the securing member is pivotally movable in a securing direction relative to the main part,
wherein the pivotal movement of the securing member in said securing direction moves the securing member to the securing position,
wherein the insertion device comprises cooperating stop formations to restrict or prevent rotation of the securing member in the securing direction to the insertion position,
wherein the securing member comprises a first of the cooperating stop formations, wherein the main part comprises a second of the cooperating stop formations, wherein the second of the cooperating stop formations comprises a wall of the main part, wherein the spring comprises a first end region that engages the wall in a manner extending parallel to the wall such that the first end region is seated against the wall, and wherein the spring further includes a second end region connected to the securing member.

\* \* \* \* \*